United States Patent
He et al.

(10) Patent No.: US 10,234,719 B2
(45) Date of Patent: Mar. 19, 2019

(54) DISPLAY PANEL AND MANUFACTURING METHOD THEREFOR, DRIVE METHOD AND DISPLAY DEVICE

(71) Applicant: BOE TECHNOLOGY GROUP CO., LTD., Beijing (CN)

(72) Inventors: Xiaolong He, Beijing (CN); Jianhua Du, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 42 days.

(21) Appl. No.: 15/527,503

(22) PCT Filed: Jan. 21, 2016

(86) PCT No.: PCT/CN2016/071619
§ 371 (c)(1),
(2) Date: May 17, 2017

(87) PCT Pub. No.: WO2017/016205
PCT Pub. Date: Feb. 2, 2017

(65) Prior Publication Data
US 2017/0371202 A1 Dec. 28, 2017

(30) Foreign Application Priority Data
Jul. 30, 2015 (CN) .......................... 2015 1 0461297

(51) Int. Cl.
*G02F 1/1337* (2006.01)
*G02F 1/1335* (2006.01)
(Continued)

(52) U.S. Cl.
CPC ..... *G02F 1/133528* (2013.01); *G02B 5/3058* (2013.01); *G02B 27/26* (2013.01);
(Continued)

(58) Field of Classification Search
CPC .......................... G02F 1/133753; G02B 27/26
See application file for complete search history.

(56) References Cited

U.S. PATENT DOCUMENTS

| | | | |
|---|---|---|---|
| 2006/0023143 A1* | 2/2006 | Lee | G02B 27/26 349/102 |
| 2008/0150871 A1* | 6/2008 | Park | G09G 3/3607 345/98 |

FOREIGN PATENT DOCUMENTS

| | | |
|---|---|---|
| CN | 202343403 U | 7/2012 |
| CN | 203184609 U | 9/2013 |

(Continued)

OTHER PUBLICATIONS

First Chinese Office Action dated May 25, 2017.

*Primary Examiner* — Alexander P Gross
(74) *Attorney, Agent, or Firm* — Dilworth & Barrese, LLP; Michael J. Musella, Esq.

(57) ABSTRACT

A display panel and a manufacturing method therefor, a drive method and a display device. The display panel includes a first substrate and a second substrate which are arranged opposite to each other. The first substrate includes a first base substrate, and a plurality of first wire grid polarizers and a plurality of pixel units, which are successively located on a side of the first base substrate facing the second substrate in an array arrangement; polarization directions of two adjacent first wire grid polarizers are perpendicular to each other. The second substrate includes: a second base substrate, and a plurality of second wire grid polarizers in an array arrangement which are located on a side of the second base substrate facing the first substrate, and polarization directions of two adjacent second wire grid polarizers are perpendicular to each other.

13 Claims, 8 Drawing Sheets

(51) Int. Cl.
*G02B 27/26* (2006.01)
*G02B 5/30* (2006.01)
(52) U.S. Cl.
CPC .. *G02F 1/133753* (2013.01); *G02F 1/133788* (2013.01); *G02F 2001/133538* (2013.01); *G02F 2001/133548* (2013.01); *G02F 2001/133757* (2013.01)

(56) References Cited

FOREIGN PATENT DOCUMENTS

| | | |
|---|---|---|
| CN | 103486899 A | 1/2014 |
| CN | 103846415 A | 6/2014 |
| EP | 0376976 B1 | 3/1993 |

\* cited by examiner

DISPLAY PANEL AND MANUFACTURING METHOD THEREFOR, DRIVE METHOD AND DISPLAY DEVICE

TECHNICAL FIELD

Embodiments of the present disclosure provide a display panel and manufacturing method thereof, a drive method and a display device.

BACKGROUND

Thin Film Transistor Liquid Crystal Displays (TFT-LCDs) are the mainstream products in the display field at present. With the development of technology, LCDs are used in the three dimensional (3D) display field.

Currently, 3D display modes based on the LCD display technology mainly are of a glasses 3D type and a naked eye 3D type. The glass 3D type mainly comprises a shutter glasses type and a polarized glasses type. The shutter glasses are too expensive, inconvenient to wear, and suffer from flicker phenomenon, and therefore, the polarized glasses type is the most commonly used type at present. As for the polarized glasses type, a polarizer (POL) is usually attached to a surface of the LCD display module, the accuracy of attaching the POL needs to be higher, in addition, a thin-film retarder needs to be attached onto the POL, which leads to a thicker module, and attaching of the thin-film retarder also has requirement of the accuracy.

Figure 1:
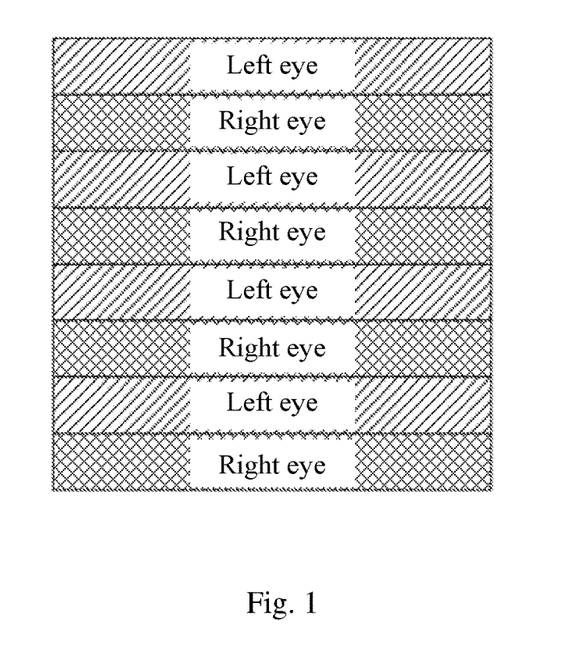
FIG. 1 is a schematic view of images observed by a left eye and a right eye during displaying a 3D image in the prior art.

When 3D display of the polarized glasses type is carried out through the polarized glasses, a left eye only observes the image for the left eye, and a right eye only observes the image for the right eye, because the POL and the thin-film retarder need to be attached to the surface of the LCD display for 3D display, and the requirement of the accuracy is higher during attaching the POL and the thin-film retarder, normally adjacent N lines pixels display the left eye image, the next adjacent N lines pixels display the right eye image, wherein N is an integer which is equal or greater than 1, as illustrated in FIG. 1, the 3D display for which the left eye image and the right eye image are displayed in an interlace mode has problems such as image of bad stereoscopic sense, serious fringe feeling and being not fine.

SUMMARY

Embodiments of the present disclosure provide a display panel and manufacturing method thereof, a drive method and a display device, so that there is no fringe feeling when displaying a 3D image, the stereoscopic sense of the display picture is stronger, telepresence is more realistic, and there is no need to attach a polarizer and a thin-film retarder, so as to further reduce production costs.

An embodiment of the present disclosure provides a display panel, comprising: a first substrate and a second substrate which are disposed opposite to each other; and a liquid crystal layer located between the first substrate and the second substrate. The first substrate comprises a first base substrate, and a plurality of first wire grid polarizers and a plurality of pixel units, which are successively located on a side of the first base substrate facing the second substrate and in an array arrangement; each of the plurality of pixel units comprises at least three sub-pixel units; each of the plurality of first wire grid polarizers corresponds to one sub-pixel unit, and polarization directions of two adjacent first wire grid polarizers are perpendicular to each other; or each of the plurality of first wire grid polarizers corresponds to one pixel unit, and polarization directions of two adjacent first wire grid polarizers are perpendicular to each other. The second substrate comprises: a second base substrate, and a plurality of second wire grid polarizers in an array arrangement which are located on a side of the second base substrate facing the first substrate, each of the plurality of second wire grid polarizers corresponds to one first wire grid polarizer, and polarization directions of two adjacent second wire grid polarizers are perpendicular to each other.

An embodiment of the present disclosure further provides a display device, the display device comprises the above mentioned display panel.

An embodiment of the present disclosure further provides a method for manufacturing a display panel, the method comprises: manufacturing a plurality of first wire grid polarizers in an array arrangement on a first base substrate; manufacturing a plurality of pixel units in an array arrangement, a plurality of gate lines and a plurality of data lines crossing each other on the first base substrate by a patterning process, wherein each of the plurality of pixel units comprises at least three sub-pixel units; wherein each of the plurality of first wire grid polarizers corresponds to one sub-pixel unit, and polarization directions of two adjacent first wire grid polarizers are perpendicular to each other; or each of the plurality of first wire grid polarizers corresponds to one pixel unit, and polarization directions of two adjacent first wire grid polarizers are perpendicular to each other; and manufacturing a plurality of second wire grid polarizers in an array arrangement on a second base substrate, wherein each of the plurality of second wire grid polarizers corresponds to one first wire grid polarizer, and polarization directions of two adjacent second wire grid polarizers are perpendicular to each other; and assembling the first base substrate and the second base substrate to form a cell, and injecting a liquid crystal between the first base substrate and the second base substrate.

An embodiment of the present disclosure further provides a drive method of the above mentioned display panel, the method comprises: inputting a first image signal or a second image signal to first display units; and inputting a second image signal or a first image signal to second display units; wherein the first display units are sub-pixel units or pixel units corresponding to the first wire grid polarizers with a same polarization direction; the second display units are sub-pixel units or pixel units which are different from the first display units; and the first image signal and the second image signal are preset image signals.

BRIEF DESCRIPTION OF THE DRAWINGS

In order to clearly illustrate the technical solution of the embodiments of the disclosure, the drawings of the embodiments will be briefly described in the following, it is obvious that the described drawings are only related to some embodiments of the disclosure and thus are not limitative of the disclosure.

FIGS. 4(*a*), 4(*b*) and 4(*c*) are structure schematic views of a cross-section of a display panel provided in an embodiment of the present disclosure;

FIGS. 7(*a*) and 7(*b*) are schematic views of polarization directions of a first wire grid polarizer and a second wire grid polarizer and alignment directions of a first alignment unit and a second alignment unit provided in an embodiment of the present disclosure;

FIGS. 9(*a*) and 9(*b*) are schematic views of a display panel during displaying a 3D image provided in an embodiment of the present disclosure; and FIGS. 10(*a*) and 10(*b*) are schematic views of images observed by a left eye and a right eye during displaying a 3D image provided in an embodiment of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Embodiments of the present disclosure provide a display panel and manufacturing method thereof, a drive method and a display device, so that there is no fringe feeling when displaying a 3D image, the stereoscopic sense of the display picture is stronger, and telepresence is more realistic.

The display panel provided in an embodiment of the present disclosure will be described below in detail in connection with the drawings.

Thickness or the shape of each layer in drawings does not represent the real scale of the display panel, it is merely to illustrate the technical solutions of the present disclosure in an explanatory manner.

Figure 2:
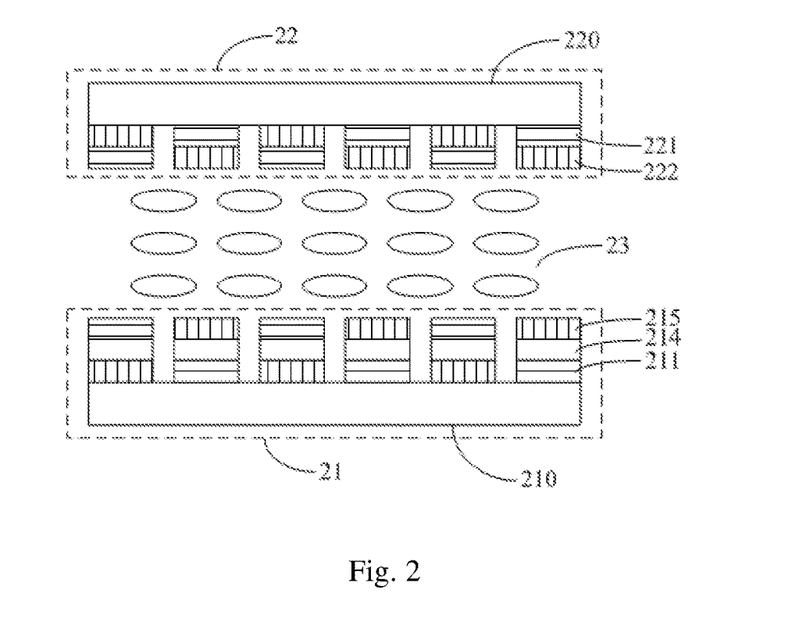
FIG. 2 is a structure schematic view of a cross-section of a display panel provided in an embodiment of the present disclosure.
Figure 3:
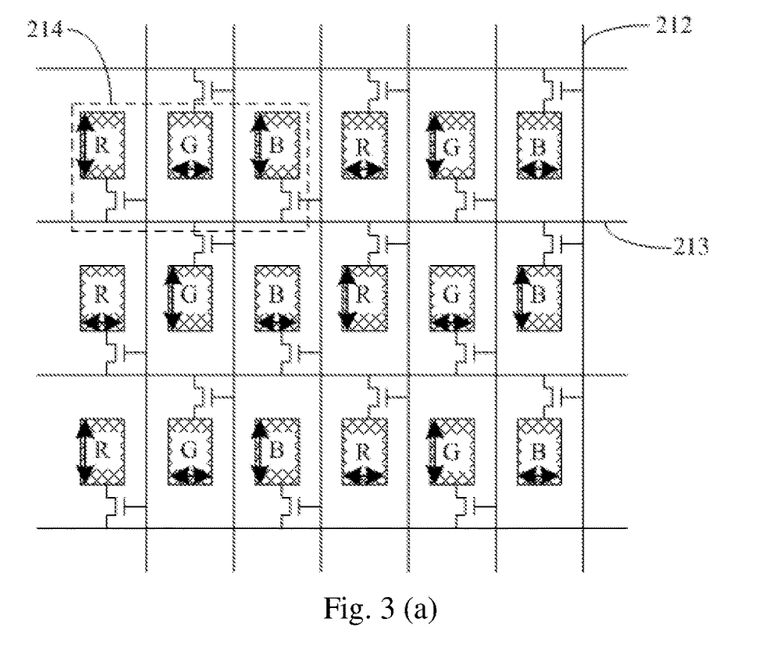
FIGS. 3(a) and 3(b) are schematic views of a planar structure of a display panel provided in an embodiment of the present disclosure.

As illustrated in FIG. 2, an embodiment of the present disclosure provides a display panel, comprising a first substrate 21 and a second substrate 22 which are arranged opposite to each other, and a liquid crystal layer 23 located between the first substrate 21 and the second substrate 22, wherein: the first substrate 22 comprises: a first base substrate 210, and a plurality of first wire grid polarizers 211 and a plurality of pixel units 214, which are successively located on a side of the first base substrate 210 facing the second substrate 22 and in an array arrangement; each of the pixel units 214 comprises at least three sub-pixel units, as illustrated in FIGS. 3(*a*) and 3(*b*), each of the pixel units 214 comprises three sub-pixel units, including red (R), green (G) and blue (B) sub-pixel units.

As illustrated in FIGS. 2 and 3(*a*), each of the first wire grid polarizers 211 corresponds to one sub-pixel unit, for instance, has the position correspondence, namely an orthographic projection of the first wire grid polarizers 211 on the first base substrate 210 at least partially overlaps with an orthographic projection of the sub-pixel unit on the first base substrate 210; the case that the orthographic projection of the first wire grid polarizers 211 on the first base substrate 210 completely overlaps with the orthographic projection of the sub-pixel unit on the first base substrate 210 is taken as an example to describe the embodiment of the present disclosure, for instance: positions of three adjacent first wire grid polarizers 211 of the same row respectively correspond to positions of the R sub-pixel unit, the G sub-pixel unit and the B sub-pixel unit, polarization directions of two adjacent first wire grid polarizers 211 are perpendicular to each other, and the directions of arrows in FIG. 3(*a*) indicate the polarization directions of the first wire grid polarizers 211.

Alternatively, as illustrated in FIGS. 2 and 3(*b*), each of the first wire grid polarizers 211 corresponds to one pixel unit 214, for instance, has the position correspondence, namely the orthographic projection of the first wire grid polarizers 211 on the first base substrate 210 at least partially overlaps with an orthographic projection of the pixel unit 214 on the first base substrate 210; the case that the orthographic projection of the first wire grid polarizer 211 on the first base substrate 210 completely overlaps with the orthographic projection of the pixel unit 214 on the first base substrate 210 is taken as an example to describe the embodiment of the present disclosure, polarization directions of two adjacent first wire grid polarizers 211 are perpendicular to each other, and the directions of the arrows in FIG. 3(*b*) indicate the polarization directions of the first wire grid polarizers 211.

As illustrated in FIG. 2, the second substrate 22 comprises: a second base substrate 220, and a plurality of second wire grid polarizers 221 which are located on a side of the second base substrate 220 facing the first substrate 21 and in an array arrangement, a position of each of the plurality of second wire grid polarizers 221 corresponds to a position of one first wire grid polarizer 211, and polarization directions of two adjacent second wire grid polarizers 221 are perpendicular to each other.

For example, as illustrated in FIGS. 3(*a*) and 3(*b*), the first substrate in the embodiment of the present disclosure comprises a plurality of gate lines 212 and a plurality of data lines 213 crossing each other and located on the first wire grid polarizers, wherein: as illustrated in FIG. 3(*a*), each row of the data lines 213 is alternately connected to a previous and a next row sub-pixel units of the data line 213, and each column of the gate lines 212 is connected to one column sub-pixel unit; or as illustrated in FIG. 3(*b*), each row of the data lines is alternately connected to a sub-pixel unit in the previous row and a sub-pixel unit in the next row with respect to the present row of the data lines, and each column of the gate lines 212 is connected to one column sub-pixel unit.

As illustrated in FIG. 2, the first substrate 21 in the embodiment of the present disclosure comprises a plurality of first alignment units 215 in an array arrangement which are located on the gate lines, the data lines and the pixel units 214, the position of each of the first alignment units 215 corresponds to the position of one first wire grid polarizer 211, and alignment directions of two adjacent first alignment units 215 are perpendicular to each other; and the second substrate 22 comprises a plurality of second alignment units 222 in an array arrangement which are located on the second wire grid polarizers 221, the position of each of the second alignment units 222 corresponds to the position of one first alignment unit 215, and alignment directions of two adjacent second alignment units 222 are perpendicular to each other.

Figure 4:
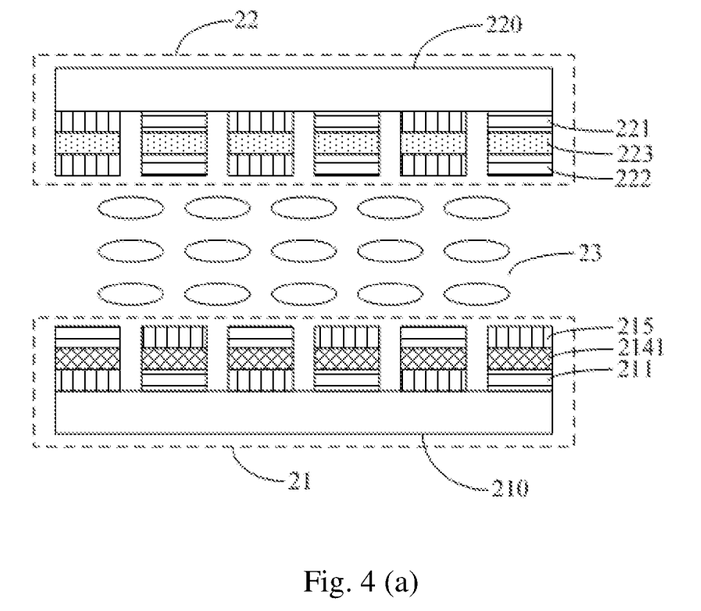

As illustrated in FIG. 4(*a*), in the embodiment of the present disclosure, in the case that the second wire grid polarizers 221 and the first wire grid polarizers 211, positions of which correspond to each other, have the same polarization directions, the first substrate 21 in the embodiment of the present disclosure further comprises a pixel electrode 2141 which are located between the first wire grid polarizers 211 and the first alignment units 215, the second substrate 22 further comprises a common electrode 223 which are located between the second wire grid polarizers 221 and the second alignment units 222, the case that the first substrate 21 is an array substrate and the second substrate 22 is a color filter substrate is taken as an example to describe the embodiment of the present disclosure. In this case, a vertical electric field is generated between the first substrate 21 and the second substrate 22, the display panel in the embodiment of the present disclosure can be a twisted nematic (TN) mode display panel or a vertical alignment (VA) mode display panel.

As illustrated in FIG. 4(b), in the embodiment of the present disclosure, in the case that the second wire grid polarizers 221 and the first wire grid polarizers 211, positions of which correspond to each other, have polarization directions perpendicular to each other, the first substrate 21 in the embodiment of the present disclosure further comprises a pixel electrode 2141 and a common electrode 223, which are insulated from each other and are located between the first wire grid polarizers 211 and the first alignment units 215. In this case, a multidimensional electric field is generated in the first substrate 21, the display panel in the embodiment of the present disclosure can be an advanced super dimension switch (ADS) mode display panel.

As illustrated in FIG. 4(c), in the embodiment of the present disclosure, in the case that the second wire grid polarizers 221 and the first wire grid polarizers 211, positions of which correspond to each other, have polarization directions perpendicular to each other, the first substrate 21 in the embodiment of the present disclosure further comprises a pixel electrode 2141 and a common electrode 223, which are arranged at an interval on the same layer and located between the first wire grid polarizers 211 and the first alignment units 215. In this case, a transverse electric field is generated in the first substrate 21, the display panel in the embodiment of the present disclosure can be an in-plane switching (IPS) mode display panel.

The first wire grid polarizers (WGP) and the second wire grid polarizers (WGP) in the embodiment of the present disclosure are formed of metal wire grid of about 100 nm, which are manufactured on a base substrate, and can play a role of light polarizing, the light, a polarization direction of which is parallel to the wire grid, is absorbed, and the light, a polarization direction of which is perpendicular to the wire grid, is transmitted therethrough, in the embodiment of the present disclosure, the first wire grid polarizers and the second wire grid polarizers play a role of a polarizer, therefore liquid crystal alignment in the embodiment of the present disclosure needs to be matched with the first wire grid polarizers and the second wire grid polarizers.

For example, in the embodiment of the present disclosure, in the case that the second wire grid polarizers 221 and the first wire grid polarizers 211, positions of which correspond to each other, have the same polarization directions, the display panel in the embodiment of the present disclosure can be a TN mode display panel or a VA mode display panel. In the embodiment of the present disclosure, the second alignment units 222 and the first alignment units 215 are used to align the liquid crystal of the liquid crystal layer 23; in this case, in order to match the liquid crystal alignment with the first wire grid polarizers 211 and the second wire grid polarizers 221, the alignment direction of the second alignment units 222 and the alignment direction of the first alignment units 215 are perpendicular to each other in the embodiment of the present disclosure, in implementation, the alignment direction of the first alignment units 215 and the polarization direction of the first wire grid polarizers 211 are perpendicular. Certainly, in an actual design, as for the TN mode display panel, the alignment directions of all the first alignment units 215 may be the same, and the alignment directions of all the second alignment units 222 also may be the same; thus, an image display can be realized by controlling an intensity of an electric field between the first substrate and the second substrate.

For example, in the embodiment of the present disclosure, in the case that the second wire grid polarizers 221 and the first wire grid polarizers 211, positions of which correspond to each other, have perpendicular polarization directions, the display panel in the embodiment of the present disclosure can be an ADS mode display panel, and also can be an IPS mode display panel. In the embodiment of the present disclosure, the second alignment units 222 and the first alignment units 215 are used to align the liquid crystal of the liquid crystal layer 23; in this case, in order to match the liquid crystal alignment with the first wire grid polarizers 211 and the second wire grid polarizers 221, the alignment direction of the second alignment units 222 and the alignment direction of the first alignment units 215 are the same in the embodiment of the present disclosure, in implementation, the alignment direction of the first alignment units 215 and the polarization direction of the first wire grid polarizers 211 are perpendicular.

For example, materials of the first alignment units 215 and the second alignment unit 222 are photosensitive materials which are aligned by light in the embodiment of the present disclosure, in practice, the materials of the first alignment units 215 and the second alignment units 222 are amide resin.

For example, as illustrated in FIG. 4(b), in the embodiment of the present disclosure, the pixel electrode 2141 and the common electrode 223 are insulated by an insulating layer 2142, a material of the pixel electrode 2141 in the embodiment of the present disclosure can be a monolayer of indium tin oxide (ITO) or indium zinc oxide (IZO), and also can be a composite film of indium tin oxide (ITO) and indium zinc oxide (IZO), for example, a material of the common electrode 223 and the material of the pixel electrode 2141 are the same in the embodiment of the present disclosure. A material of the insulating layer 2142 is a monolayer of silicon oxide ($SiO_2$) or silicon nitride (SiN), and also can be a composite film of silicon oxide ($SiO_2$) and silicon nitride (SiN), in the embodiment of the present disclosure, a concrete method for manufacturing the pixel electrode 2141, the common electrode 223 and the insulating layer 2142 may be the same as a method in the prior art.

An embodiment of the present disclosure further provides a display device, and the display device comprises the above mentioned display panel provided in any one of the embodiments of the present disclosure, the display device may be a liquid crystal panel, a liquid crystal display, a liquid crystal television, an organic light emitting diode (OLED) display, an OLED television and other display devices.

A manufacturing method of the display panel provided in an embodiment of the present disclosure will be described below in detail in connection with the drawings.

Figure 5:
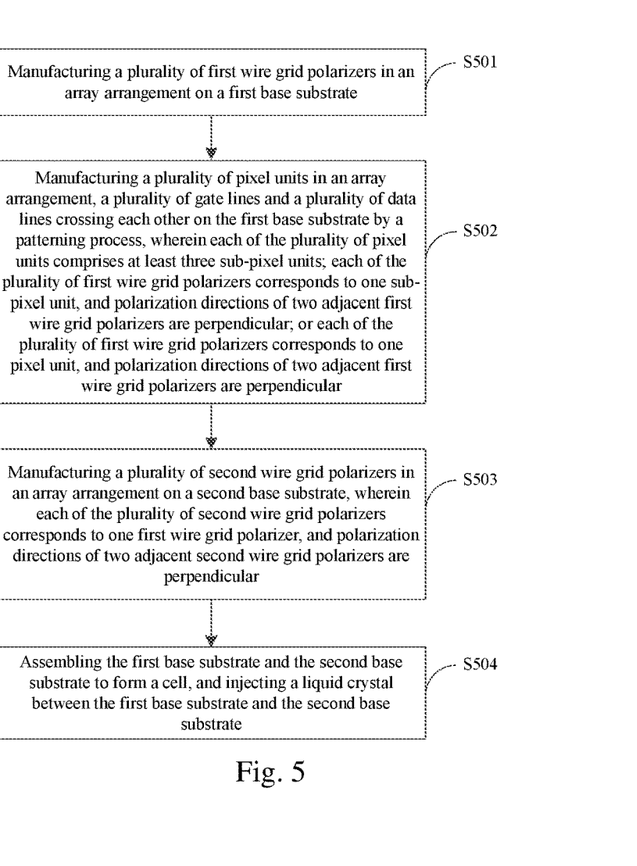
FIG. 5 is a flow process of a manufacturing method of a display panel provided in an embodiment of the present disclosure.

As illustrated in FIG. 5, a specific embodiment of the present disclosure further provides a method for manufacturing a display panel, and the method comprises:

Step S501, manufacturing a plurality of first wire grid polarizers in an array arrangement on a first base substrate;

Step S502, manufacturing a plurality of pixel units in an array arrangement, a plurality of gate lines and a plurality of data lines crossing each other on the first base substrate by a patterning process, wherein each of the pixel units comprises at least three sub-pixel units, a position of each first wire grid polarizer corresponds to a position of one sub-pixel unit, and polarization directions of two adjacent first wire grid polarizers are perpendicular to each other; or the position of each first wire grid polarizer corresponds to a position of one pixel unit, and polarization directions of two adjacent first wire grid polarizers are perpendicular to each other, and wherein each pixel unit is defined by the gate lines and the data lines crossing each other;

Step S503, manufacturing a plurality of second wire grid polarizers in an array arrangement on a second base substrate, wherein a position of each second wire grid polarizer corresponds to a position of one first wire grid polarizer, and polarization directions of two adjacent second wire grid polarizers are perpendicular to each other;

Step S504, assembling the first base substrate and the second base substrate to form a cell, and injecting a liquid crystal between the first base substrate and the second base substrate.

A method of manufacturing a plurality of first wire grid polarizers in an array arrangement on the first base substrate and a method of manufacturing a plurality of second wire grid polarizers in an array arrangement on the second base substrate will be described below, because the method for manufacturing the first wire grid polarizers is similar to the method for manufacturing the second wire grid polarizers, the method of manufacturing a plurality of first wire grid polarizers in an array arrangement on the first base substrate is taken as an example to describe the concrete embodiment of the present disclosure in detail.

Method 1:

Firstly forming a metal nano particle layer on a surface of a prepared substrate by spin coating, then imprinting a nano imprint mould on the prepared substrate, wherein the convex part of the mould is adhered with the metal nano particles, next transferring the metal nano particles to the first base substrate to achieve the transfer of a nano pattern, and finally forming a plurality of first wire grid polarizers in an array arrangement through a high temperature thermal annealing.

Method 2:

Firstly, a metal layer is deposited on the first base substrate, in which the deposited metal layer in the embodiment of the present disclosure can be a metal layer of metal molybdenum, metal aluminum and etc. In a specific implementation process, a thickness of the deposited metal layer is 100 nm, certainly, in an actual production process, the thickness of the deposited metal layer is adjusted according to the specific process and the production requirements, and the embodiment of the present disclosure does not limit the thickness of the deposited metal layer.

Figure 6:
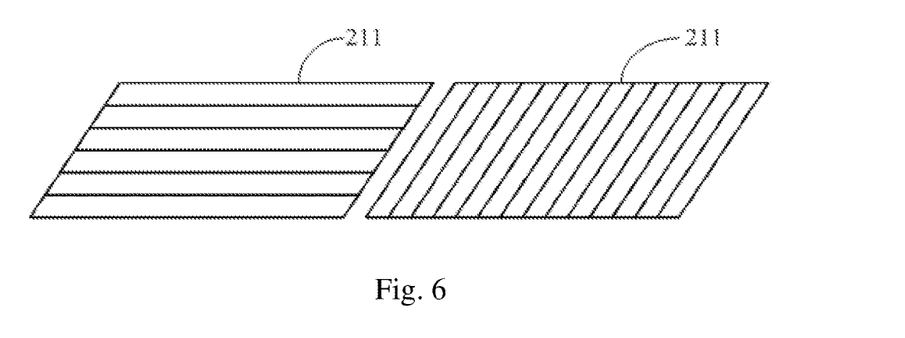
FIG. 6 is a schematic view of a first wire grid polarizer provided in an embodiment of the present disclosure.

Then, a plurality of first wire grid polarizers are formed in an array arrangement by patterning the metal layer. For example, the patterning process comprises: coating a photoresist on the metal layer, exposing and developing the coated photoresist to expose the metal layer which needs to be removed after development, then removing the exposed metal layer by etching, finally removing the remaining photoresist to form a plurality of first wire grid polarizers in an array arrangement, as illustrated in FIG. 6, in which the first wire grid polarizers corresponding to the two adjacent sub-pixel units only are shown in the figure.

As illustrated in FIGS. 3(a) and 3(b), in the embodiment of the present disclosure, a plurality of gate lines 212, a plurality of data lines 213 and pixel units 214 in an array arrangement are manufactured by a patterning process on the first base substrate on which the first wire grid polarizers 211 are manufactured; in the embodiment of the present disclosure, the gate lines 212 manufactured are arranged in a vertical direction, and the data lines 213 are arranged in a horizontal direction, the method of the embodiment of the present disclosure for manufacturing the gate lines 212, the data lines 213 and the pixel units 214 may be the same as the method in the prior art, which will not be elaborated here.

When the display panel of an embodiment of the present disclosure displays, the liquid crystal alignment needs to be matched with the first wire grid polarizers and the second wire grid polarizers, a method for manufacturing the first alignment units and the second alignment units, which are matched with the first wire grid polarizers and the second wire grid polarizers respectively, will be described below, because the method for manufacturing the second alignment units is similar to the method for manufacturing the first alignment units, the method for manufacturing the first alignment units is taken as an example to describe the embodiment of the present disclosure in particular.

In an embodiment of the present disclosure, an alignment layer is manufactured by methods such as spin coating on the first base substrate where the gate lines, the data lines and the pixel units are manufactured, for example, an amide resin layer is manufactured by a spin coating method on the first base substrate where the gate lines, the data lines and the pixel units are manufactured, and exposed by polarized UV light with a mask in process of exposure for shielding so that the two adjacent pixel units or sub-pixel units are exposed respectively by polarized UV light in the vertical direction, so as to obtain a plurality of first alignment units in an array arrangement.

In an embodiment of the present disclosure, the alignment layer is composed of the alignment units, which are manufactured with the photosensitive material through light aligning, compared with the method of manufacturing the alignment layer by a rubbing process in the state of art, the liquid crystal alignment of each sub-pixel in the embodiment of the present disclosure can be different from each other. Certainly, as for the TN mode display panel, for manufacturing the first alignment units and the second alignment units in the embodiment of the present disclosure, the rubbing method of the state of art can also be adopted.

For example, the embodiment of the present disclosure further comprises manufacturing a color film layer and a black matrix on the second base substrate, where the second wire grid polarizers are manufactured; the method of an embodiment of the present disclosure for manufacturing the color film layer and the black matrix may be the same as the method in the state of art, which will not be elaborated here.

The method of an embodiment of the present disclosure for assembling the first base substrate having the first alignment units and the second base substrate having the second alignment units to form a cell and the method for injecting the liquid crystal between the first base substrate and the second base substrate may be the same as the method in the state of art, which will not be elaborated here.

When the display panel manufactured by the embodiment of the present disclosure is a TN mode display panel or a VA mode display panel, as illustrated in FIG. 7(a), the polarization directions of two adjacent first wire grid polarizers 211 of an embodiment of the present disclosure are the direction of the arrow 71 and the direction of the arrow 72 in the drawing respectively, and the alignment directions of the first alignment units located on the first wire grid polarizers 211 are the direction of the arrow 73 and the direction of the arrow 74 in the drawing respectively. The polarization directions of two adjacent second wire grid polarizers 221 of the embodiment of the present disclosure are the direction of the arrow 75 and the direction of the arrow 76 in the drawing respectively, and the alignment directions of the second alignment units located on the second wire grid polarizers 221 are the direction of the arrow 77 and the direction of the arrow 78 in the drawing respectively.

Figure 7:
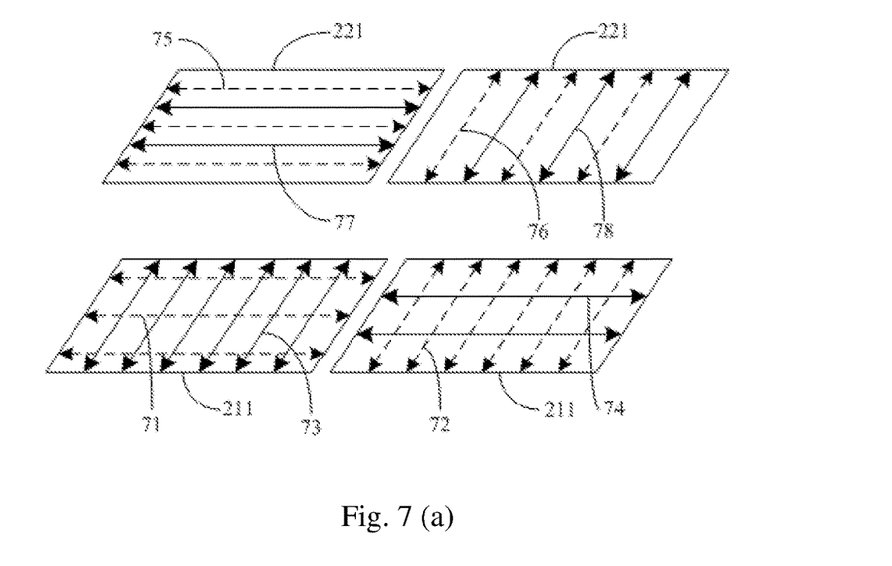

When the display panel manufactured by the embodiment of the present disclosure is an ADS mode display panel or an FFS mode display panel or the IPS mode display panel, as illustrated in FIG. 7(*b*), the polarization directions of two adjacent first wire grid polarizers 211 of the embodiment of the present disclosure are the direction of the arrow 710 and the direction of the arrow 720 in the drawing respectively, and the alignment directions of the first alignment units located on the first wire grid polarizers 211 are the direction of the arrow 730 and the direction of the arrow 740 in the drawing respectively. The polarization directions of two adjacent second wire grid polarizers 221 of the embodiment of the present disclosure are the direction of the arrow 750 and the direction of the arrow 760 in the drawing respectively, and the alignment directions of the second alignment units located on the second wire grid polarizers 221 are the direction of the arrow 770 and the direction of the arrow 780 in the drawing respectively.

A drive method of the display panel provided in an embodiment of the present disclosure will be described below in detail in connection with the drawings.

An embodiment of the present disclosure further provides a method for driving the display panel, and the method comprises: inputting a first image signal or a second image signal to first display units; and inputting the second image signal or the first image signal to second display units; wherein: the first display unit are each a sub-pixel unit or a pixel unit, a position of which corresponds to a position of one of the first wire grid polarizers with same polarization direction; the second display units are each a sub-pixel unit or a pixel unit, which is different from the first display units; and the first image signal and the second image signal are preset image signals.

Figure 8:
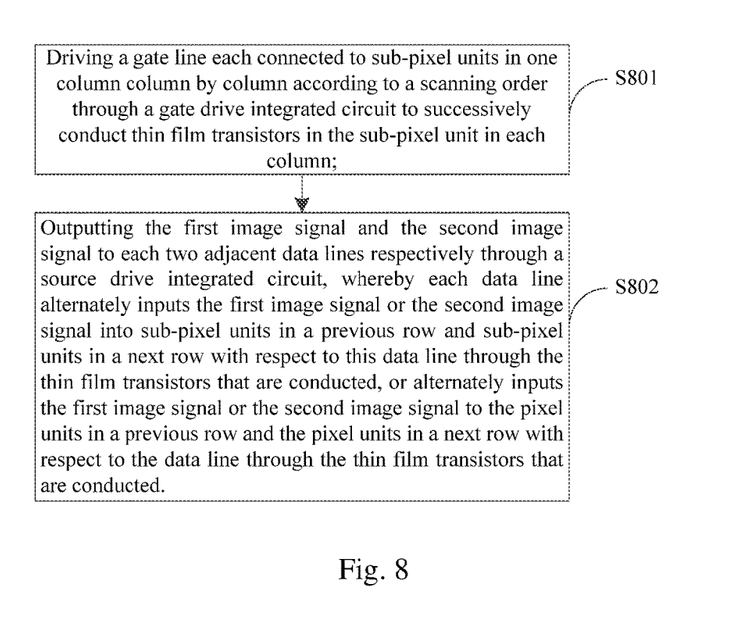
FIG. 8 is a flow process of a drive method of a display panel provided in an embodiment of the present disclosure.

For example, as illustrated in FIG. 8, the drive method of the display panel provided in the embodiment of the present disclosure comprises:

Step S801, driving gate lines each connected to one column sub-pixel unit column by column according to a scanning order through a gate drive integrated circuit to successively conduct thin film transistors in sub-pixel units of each column;

Step S802, outputting the first image signal and the second image signal to each two adjacent data lines respectively through a source drive integrated circuit, whereby each data line alternately inputs the first image signal or the second image signal into sub-pixel units in a previous row and sub-pixel units in a next row with respect to this data line through the thin film transistors that are conducted, or alternately inputs the first image signal or the second image signal to the pixel units in a previous row and the pixel units in a next row with respect to the data line through the thin film transistors that are conducted.

Figure 9:
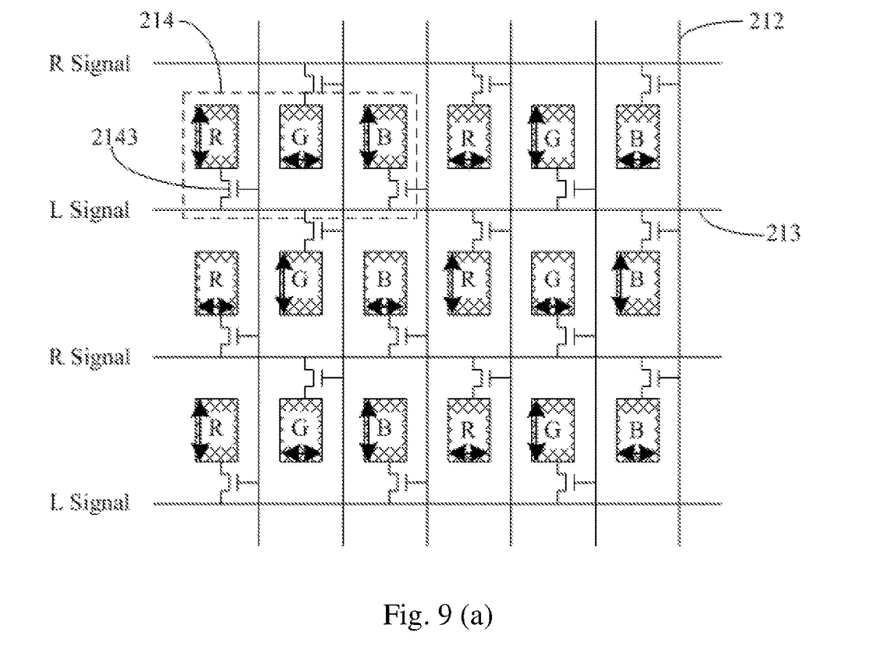

For example, when an embodiment of the present disclosure carried out 3D display, the first image signal of the embodiment of the present disclosure is a left eye image signal (L Signal) or a right eye image signal (R Signal), and the second image signal is the right eye image signal (R Signal) or the left eye image signal (L Signal), as illustrated in FIG. 9(*a*), the gate drive integrated circuit in the embodiment of the present disclosure drives the gate lines 212 each connected to one column sub-pixel unit column by column according to the scanning order, and the thin film transistors 2143 of the sub-pixel units in columns are successively conducted; the source drive integrated circuit outputs the R Signal and the L Signal to every two adjacent data lines 213 respectively, each of the data lines 213 alternately inputs the R Signal or the L Signal into the sub-pixel units in a previous row and the sub-pixel units in a next row with respect to this data line 213 through the thin film transistors 2143 that are conducted.

Figure 10:
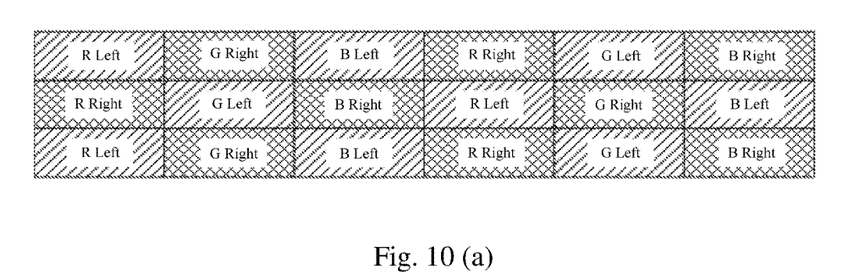

Because the polarization directions of two adjacent first wire grid polarizers are perpendicular to each other and the polarization directions of the two adjacent second wire grid polarizers are perpendicular to each other in an embodiment of the present disclosure, according to the display principle of the display panel of different display modes, when the display panel of the embodiment of the present disclosure displays, polarization directions of polarized light of two adjacent sub-pixel units are different, for example: when the display panel of the embodiment of the present disclosure displays, the polarization directions of the polarized light are the directions of the arrows illustrated in the FIG. 9(*a*), the 3D display image obtained by the embodiment of the present disclosure is shown in FIG. 10(*a*), a left eye image or a right eye image obtained in the embodiment of the present disclosure corresponds to a block pixel composed of six sub-pixel units in two adjacent rows, so that the left eye and the right eye images are arranged in a mosaic mode during the whole period of 3D displaying, which is the same as the case of observing three-dimensional objects in reality, therefore, compared with the state of art, the embodiment of the present disclosure dose not have fringe feeling when displaying a 3D image, the stereoscopic sense of the 3D display image is stronger, and telepresence is more realistic.

In addition, as illustrated in FIG. 9(*b*), the gate drive integrated circuit in an embodiment of the present disclosure drives the gate lines 212 each connected to one column sub-pixel unit column by column according to the scanning order, and the thin film transistors 2143 of the sub-pixel units in columns are successively conducted; the source drive integrated circuit outputs the R Signal and the L Signal to every two adjacent data lines 213 respectively, each of the data lines 213 alternately inputs the R Signal or the L Signal into the pixel units 214 in a previous row and the pixel units 214 in a next row with respect to this data line 213 through the thin film transistors 2143 that are conducted.

According to the display principle of the display panel of different display modes, when the display panel of the embodiment of the present disclosure displays, the polarization directions of polarized light of two adjacent pixel units are different, for example: when the display panel of the embodiment of the present disclosure displays, the polarization directions of the polarized light are shown as the directions of the arrows illustrated in the FIG. 9(*b*), the 3D display image obtained by the embodiment of the present disclosure is shown in FIG. 10(*b*), a left eye image or a right eye image obtained by the embodiment of the present disclosure corresponds to a pixel unit, so that the left eye and the right eye images are arranged in a mosaic mode during the whole 3D displaying, compared with the state of art, the embodiment of the present disclosure dose not have fringe feeling when displaying a 3D image, the stereoscopic sense of the 3D display image is stronger, and telepresence is more realistic.

In addition, when the embodiment of the present disclosure carried out 2D display, the first image signal and the second image signal of the embodiment of the present disclosure are 2D image signals (2D Signal), in this case, the left eye signal and the right eye signal are not distinguished, and the 2D image can be directly observed.

To sum up, embodiments of the present disclosure provide a display panel and manufacturing method thereof, a drive method and a display device, the display panel comprises a first substrate and a second substrate which are disposed opposite to each other, and a liquid crystal layer located between the first substrate and the second substrate; the first substrate comprises: a first base substrate, and a plurality of first wire grid polarizers and a plurality of pixel units, which are successively located on a side of the first base substrate facing the second substrate and in an array arrangement; each of the pixel units comprises at least three sub-pixel units; a position of each first wire grid polarizer corresponds to a position of one sub-pixel unit, and polarization directions of two adjacent first wire grid polarizers are perpendicular to each other; or a position of each first wire grid polarizer corresponds to a position of one pixel unit, and polarization directions of two adjacent first wire grid polarizers are perpendicular to each other. The second substrate comprises: a second base substrate, and a plurality of second wire grid polarizers in an array arrangement which are located on a side of the second base substrate facing the first substrate; a position of each second wire grid polarizer corresponds to a position of one first wire grid polarizer, and polarization directions of two adjacent second wire grid polarizers are perpendicular to each other. In the embodiment of the present disclosure, the first wire grid polarizers and the second wire grid polarizers are equivalent to a polarizer and a phase-delay film in the state of art, therefore, when inputting a left eye image signal of 3D display to sub-pixel units or pixel units which correspond to the first wire grid polarizers with the same polarization direction and inputting a right eye image signal of 3D display to the other sub-pixel units or pixel units, thus a left eye image or a right eye image are obtained in the embodiment of the present disclosure through the corresponding pixel units or pixel blocks each composed of six sub-pixel units in two adjacent rows, so that the left eye and the right eye images are arranged in a mosaic mode during the whole 3D displaying, compared with the state of art, the embodiments of the present disclosure do not have fringe feeling when displaying a 3D image, so that the stereoscopic sense of the 3D display image is stronger, and telepresence is more realistic; in addition, there is no need to attach the polarizer and the phase-delay film in the embodiment of the present disclosure, so as to reduce the thickness of a module and reduce production costs.

It is apparent to the person skilled in the art that various modification and variation can be made to the present disclosure without departing from the spirit and scope of the present disclosure. Thus, it is intended to include these modification and variation in the present disclosure if these modification and variation falls within the scope defined by the claims and its equivalents.

The application claims priority to the Chinese patent application No. 201510461297.6, filed Jul. 30, 2015, the entire disclosure of which is incorporated herein by reference as part of the present application.

What is claimed is:

1. A display panel, comprising:
a first substrate and a second substrate which are arranged opposite to each other; and
a liquid crystal layer located between the first substrate and the second substrate, wherein
the first substrate comprises: a first base substrate, and a plurality of first wire grid polarizers and a plurality of pixel units, which are successively located on a side of the first base substrate facing the second substrate in an array arrangement: each of the plurality of pixel units comprises at least three sub-pixel units;
each of the plurality of first wire grid polarizers corresponds to one sub-pixel unit, polarization directions of two adjacent first wire grid polarizers are perpendicular to each other; or each of the plurality of first wire grid polarizers corresponds to one pixel unit, polarization directions of two adjacent first wire grid polarizers are perpendicular to each other; and
the second substrate comprises: a second base substrate, and a plurality of second wire grid polarizers in an array arrangement which are located on a side of the second base substrate facing the first substrate, each of the plurality of second wire grid polarizers corresponds to one first wire grid polarizer, and polarization directions of two adjacent second wire grid polarizers are perpendicular to each other,
wherein the first substrate comprises a plurality of gate lines and a plurality of data lines crossing each other and located on the first wire grid polarizers, wherein:
each row of the data lines is alternately connected to sub-pixel units in a previous row and sub-pixel units in a next row with respect to the data line, and each column of the gate lines is connected to sub-pixel unit in this column; or
each row of the data lines is alternately connected to pixel units in a previous row and pixel units in a next row with respect to the data line, and each column of the gate lines is connected to sub-pixel unit in this column; and
wherein the first substrate comprises a plurality of first alignment units in an array arrangement which are located on the gate lines, the data lines and the pixel units, each of the plurality of first alignment units corresponds to one first wire grid polarizer, and alignment directions of two adjacent first alignment units are perpendicular to each other; and
the second substrate comprises a plurality of second alignment units in an array arrangement which are located on the second wire grid polarizer, each of the plurality of second alignment units corresponds to one first alignment unit, and alignment directions of two adjacent second alignment units are perpendicular.

2. The display panel according to claim 1, wherein the second wire grid polarizers and the first wire grid polarizers arranged correspondingly to each other have the same polarization directions, the first substrate further comprises pixel electrodes which are located between the first wire grid polarizers and the first alignment units, the second substrate further comprises a common electrode which are located between the second wire grid polarizers and the second alignment units; or
the second wire grid polarizers and the first wire grid polarizers arranged correspondingly to each other have perpendicular polarization directions, the first substrate further comprises pixel electrodes and common electrodes, which are insulated from each other and are located between the first wire grid polarizers and the first alignment units; or the first substrate comprises pixel electrodes and common electrodes, which are arranged at interval on a same layer and are located between the first wire grid polarizers and the first alignment units.

3. The display panel according to claim 2, wherein in a case where the second wire grid polarizers and the first wire grid polarizers arranged correspondingly to each other have the same polarization directions, an alignment direction of the second alignment units and an alignment direction of the first alignment units are perpendicular to each other; and in a case where the second wire grid polarizers and the first wire grid polarizers arranged correspondingly to each other have perpendicular polarization directions, the alignment direction of the second alignment units and the alignment direction of the first alignment units are the same.

4. The display panel according to claim 3, wherein materials of the first alignment units and the second alignment units are photosensitive materials which are aligned by light.

5. A method for driving the display panel according to claim 1, the drive method comprises:

inputting a first image signal or a second image signal to first display units; and inputting the second image signal or the first image signal to second display units; wherein the first display units are sub-pixel units or pixel units corresponding to the first wire grid polarizers with a same polarization direction; the second display units are sub-pixel units or pixel units which are different from the first display units; and the first image signal and the second image signal are preset image signals.

6. The drive method according to claim 5, further comprising:

driving gate lines each connected to one column sub-pixel unit column by column according to a scanning order through a gate drive integrated circuit to successively conduct thin film transistors of sub-pixel units in each column; and outputting the first image signal and the second image signal to every two adjacent data lines respectively through a source drive integrated circuit, alternately inputting the first image signal or the second image signal into sub-pixel units in a previous row and sub-pixel units in a next row with respect to each row of the data lines through thin film transistors that are conducted; or alternately inputting the first image signal or the second image signal to pixel units in a previous row and pixel units in a next row with respect to each row of the data lines through thin film transistors that are conducted.

7. The method according to claim 6, wherein in displaying 2D, the first image signal and the second image signal are 2D image signals; and in displaying 3D, the first image signal is a left eye image signal or a right eye image signal, and the second image signal is the right eye image signal or the left eye image signal.

8. A method for manufacturing a display panel, comprising:

preparing a plurality of first wire grid polarizers in an array arrangement on a first base substrate;

preparing a plurality of pixel units in an array arrangement, a plurality of gate lines and a plurality of data lines crossing each other on the first base substrate by a patterning process, wherein each of the plurality of pixel units comprises at least three sub-pixel units, each of the plurality of first wire grid polarizers corresponds to one sub-pixel unit, and polarization directions of two adjacent first wire grid polarizers are perpendicular to each other; or each of the plurality of first wire grid polarizers corresponds to one pixel unit, and polarization directions of two adjacent first wire grid polarizers are perpendicular to each other;

preparing a plurality of second wire grid polarizers in an array arrangement on a second base substrate, wherein each of the plurality of second wire grid polarizers corresponds to one first wire grid polarizer, and polarization directions of two adjacent second wire grid polarizers are perpendicular to each other; and assembling the first base substrate and the second base substrate to form a cell, and injecting a liquid crystal between the first base substrate and the second base substrate;

wherein a plurality of first alignment units in an array arrangement, which are located on the gate lines, the data lines and the pixel units, are provided on a side of the first base substrate facing the second base substrate, each of the plurality of first alignment units corresponds to one first wire grid polarizer, and alignment directions of two adjacent first alignment units are perpendicular to each other; and a plurality of second alignment units in an array arrangement, which are located on the second wire grid polarizers are provided on a side of the second base substrate facing the first base substrate, each of the plurality of second alignment units corresponds to one first alignment unit, and alignment directions of two adjacent second alignment units are perpendicular.

9. The method according to claim 8, wherein manufacturing of a plurality of first wire grid polarizers in an array arrangement on the first base substrate comprises:

imprinting metal nano particles on the first base substrate by a nano imprint technology to form a plurality of first wire grid polarizers in an array arrangement; or depositing a metal layer on the first base substrate, and forming a plurality of first wire grid polarizers in an array arrangement by a patterning process; and preparing of the plurality of second wire grid polarizers in the array arrangement on the second base substrate comprises:

imprinting metal nano particles on the second base substrate by a nano imprint technology to form a plurality of second wire grid polarizers in an array arrangement; or depositing a metal layer on the second base substrate, and forming a plurality of second wire grid polarizers in an array arrangement by a patterning process.

10. A display device, comprising a display panel, wherein the display panel comprises:

a first substrate and a second substrate which are arranged opposite to each other; and a liquid crystal layer located between the first substrate and the second substrate, wherein the first substrate comprises: a first base substrate, and a plurality of first wire grid polarizers and a plurality of pixel units, which are successively located on a side of the first base substrate facing the second substrate in an array arrangement; each of the plurality of pixel units comprises at least three sub-pixel units;

each of the plurality of first wire grid polarizers corresponds to one sub-pixel unit, polarization directions of two adjacent first wire grid polarizers are perpendicular to each other; or each of the plurality of first wire grid polarizers corresponds to one pixel unit, polarization directions of two adjacent first wire grid polarizers are perpendicular to each other; and the second substrate comprises: a second base substrate, and a plurality of second wire grid polarizers in an array arrangement which are located on a side of the second base substrate facing the first substrate, each of the plurality of second wire grid polarizers corresponds to one first wire grid polarizer, and polarization directions of two adjacent second wire grid polarizers are perpendicular to each other, wherein the first substrate comprises a plurality of gate lines and a plurality of data lines crossing each other and located on the first wire grid polarizers, wherein:

each row of the data lines is alternately connected to sub-pixel units in a previous row and sub-pixel units in a next row with respect to the data line, and each column of the gate lines is connected to sub-pixel unit in this column; or each row of the data lines is alternately connected to pixel units in a previous row and pixel units in a next row with respect to the data line, and each column of the gate lines is connected to sub-pixel unit in this column; and wherein the first substrate comprises a plurality of first alignment units in an array arrangement which are located on the gate lines, the data lines and the pixel units, each of the plurality of first alignment units corresponds to one first wire grid polarizer, and alignment directions of two adjacent first alignment units are perpendicular to each other; and the second substrate comprises a plurality of second alignment units in an array arrangement which are located on the second wire grid polarizer, each of the plurality of second alignment units corresponds to one first alignment unit, and alignment directions of two adjacent second alignment units are perpendicular.

11. The display device according to claim 10, wherein the second wire grid polarizers and the first wire grid polarizers arranged correspondingly to each other have the same polarization directions, the first substrate further comprises pixel electrodes which are located between the first wire grid polarizers and the first alignment units, the second substrate further comprises a common electrode which are located between the second wire grid polarizers and the second alignment units; or the second wire grid polarizers and the first wire grid polarizers arranged correspondingly to each other have perpendicular polarization directions, the first substrate further comprises pixel electrodes and common electrodes, which are insulated from each other and are located between the first wire grid polarizers and the first alignment units; or the first substrate comprises pixel electrodes and common electrodes, which are arranged at interval on a same layer and are located between the first wire grid polarizers and the first alignment units.

12. The display device according to claim 11, wherein in a case where the second wire grid polarizers and the first wire grid polarizers arranged correspondingly to each other have the same polarization directions, an alignment direction of the second alignment units and an alignment direction of the first alignment units are perpendicular to each other; and in a case where the second wire grid polarizers and the first wire grid polarizers arranged correspondingly to each other have perpendicular polarization directions, the alignment direction of the second alignment units and the alignment direction of the first alignment units are the same.

13. The display device according to claim 12, wherein materials of the first alignment units and the second alignment units are photosensitive materials which are aligned by light.

* * * * *